US012088503B1

(12) United States Patent
Lenglet

(10) Patent No.: US 12,088,503 B1
(45) Date of Patent: Sep. 10, 2024

(54) INGRESS GATEWAY WITH DATA FLOW CLASSIFICATION FUNCTIONALITY

(71) Applicant: AVIATRIX SYSTEMS, INC., Santa Clara, CA (US)

(72) Inventor: Romain Lenglet, Santa Clara, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 325 days.

(21) Appl. No.: 17/727,884

(22) Filed: Apr. 25, 2022

Related U.S. Application Data

(60) Provisional application No. 63/182,686, filed on Apr. 30, 2021.

(51) Int. Cl.
*H04L 47/2441* (2022.01)
*H04L 12/66* (2006.01)
*H04L 45/00* (2022.01)

(52) U.S. Cl.
CPC .......... *H04L 47/2441* (2013.01); *H04L 12/66* (2013.01); *H04L 45/34* (2013.01)

(58) Field of Classification Search
CPC ...... H04L 47/2441; H04L 12/66; H04L 45/34
See application file for complete search history.

(56) References Cited

U.S. PATENT DOCUMENTS

2014/0334304 A1\* 11/2014 Zang .................. H04L 47/2441
370/235
2020/0374229 A1\* 11/2020 Vysotsky ................ H04L 41/12

FOREIGN PATENT DOCUMENTS

WO     WO-2018112657 A1 \*  6/2018  ............. H04L 12/66

\* cited by examiner

*Primary Examiner* — Duc C Ho
(74) *Attorney, Agent, or Firm* — Winstead PC

(57) ABSTRACT

A computerized method for providing network policy-based routing of a data flow is described. After obtaining attributes associated with an incoming data flow, a first gateway is configured to determine one or more network policies based on the attributes associated with the incoming data flow and assign a classification identifier based on the one or more network policies. The classification identifier is configured to influence routing paths through at least one cloud network, where the classification identifier is encapsulated into content of the incoming data flow to generate a classified data flow for routing from a source to a destination through the at least one cloud network.

22 Claims, 8 Drawing Sheets

INGRESS GATEWAY WITH DATA FLOW CLASSIFICATION FUNCTIONALITY

CROSS-REFERENCE TO RELATED APPLICATIONS

This application claims the benefit of priority of U.S. Provisional Patent Application No. 63/182,686, filed Apr. 30, 2021, the entire contents of which are incorporated by reference herein.

FIELD

Embodiments of the disclosure relate to the field of networking. More specifically, one embodiment of the disclosure relates to a cloud network infrastructure that reliably associates applications pertaining to a cloud instance to data flows propagating over the cloud network.

GENERAL BACKGROUND

Over the past few years, cloud computing has provided an Infrastructure as a Service (IaaS), where resources are provided as part of a public cloud network and are made accessible to tenants as a service. One of these services allows tenants to run software components (e.g., virtual machines instances such as virtual servers) residing within the public cloud network. Hence, this migration of software functionality has resulted in an increased usage of virtual private cloud networks (VPCs), namely on-demand, configurable pools of shared resources, which are allocated within a public cloud network and provide a certain level of isolation between the different organizations or other entities (hereinafter, "users") using the resources. However, this increased usage of public cloud network resources has led to greater data traffic and added complexity to cloud network management.

Recently, some software platforms have been developed and deployed with an ability to monitor and manage cloud networking, independent of the selected public cloud provider or providers. For example, one software platform features a controller and a group of gateways, which are deployed as software components of a VPC and are communicatively coupled to each other. For this software platform, the controller and gateways may be configured to support the transmission of a data flow (e.g., a routing of data packets) over a cloud network, where the packets associated with the data flow are routed from a source (e.g., a first application) to a destination (e.g., a second application).

For this conventional network architecture, due to increased cloud complexity, it has become very difficult to discern, with certainty, what applications are related to a data flow propagating over a network in order to determine how the data flow is handled to meet different requirements for that application. Conventionally, each application is assigned an Internet Protocol (IP) address that is included in each packet of the data flow. However, as IP addresses become increasingly ephemeral, their use in identifying an application as the source of a data flow is becoming less and less reliable. Stated differently, due exponential growth of resources identified by an IP address within the cloud network, these IP addresses will need to become more ephemeral, and thus, reliance on IP address for source identification will become less reliable over time.

Moreover, as the amount of data traffic escalates, due to more and more enterprises migrating software components into the cloud network, the operational complexity needed by each gateway to monitor and manage routing of the data traffic has increased commensurably. This operational complexity may stem from the need to more frequently update changes in routing configurations, which is time consuming and disruptive to ongoing communications. The convergence (stabilization) of the network and avoidance of disruption in data communications within the VPCs deployed as part of a public cloud network is necessary as more companies migrate their networking operations to the public cloud network. A technique is needed, and described below, to achieve network convergence through policy-based routing and more accurate of data flows.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
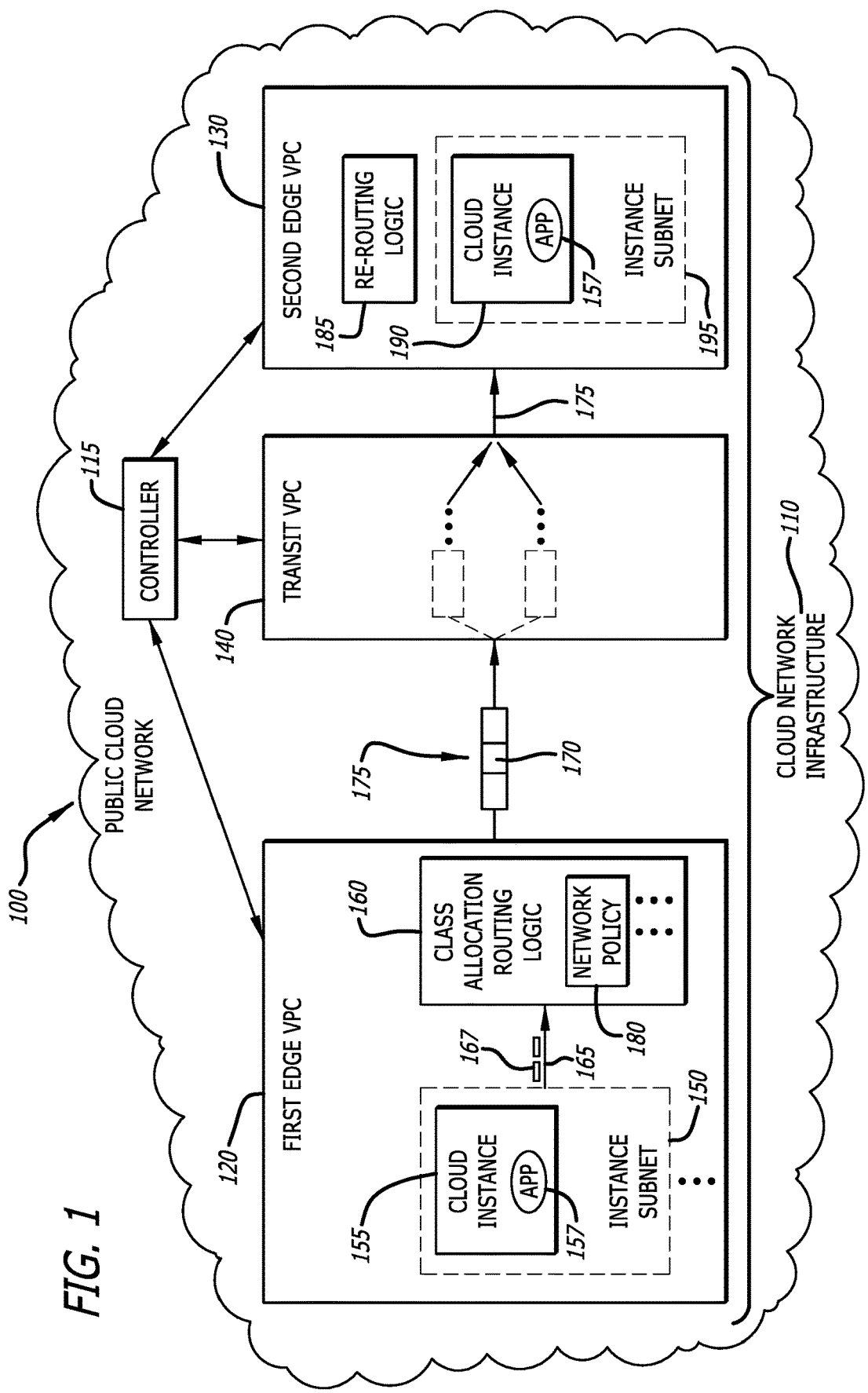
FIG. 1 is an exemplary embodiment of a cloud network infrastructure that performs policy-based data flow classification.

Embodiments of a system and method directed to an improved cloud network infrastructure based on a policy-based, data traffic management scheme is described. The cloud network infrastructure supports policy-based routing of a data flow (e.g., a message or a series of messages) between network devices. Herein, a first network device, referred to as a gateway, is configured to operate with a controller to assign a classification identifier to each data flow propagating over a cloud network infrastructure. The classification identifier (hereinafter, "ClassID") identifies the type of data flow, where such identification is predicated on which user-defined network policy (or which group of two or more network policies) includes requirements regarding the forwarding of data flows that are satisfied by certain attributes associated with the source and/or destination of the data flow and attributes of the flow itself. Herein, the ClassID may correspond to a determined network policy (e.g., one-to-one mapping between each ClassID and a corresponding network policy) or the ClassID may correspond to a certain group (combination) of network policies. The use of the ClassID would provide a more reliable association between applications and their data flows propagating over the cloud network as well as the context of the data flow itself.

One embodiment of the cloud network infrastructure may include a collection of software components maintained within a public cloud network, where these software components operate as (i) virtual private cloud networks at the edge of the cloud network (hereinafter, "edge VPCs") and (ii) a virtual private cloud network that supports the propagation of data traffic from one VPC to another (hereinafter, "transit VPC"). Herein according to this embodiment, a first edge VPC may include at least one gateway (hereinafter, "ingress gateway"), which are communicatively coupled to one or more cloud instances. Each cloud instance may support one or more cloud-based applications. A second edge VPC may include at least one gateway (hereinafter, "egress gateway"), which is communicatively coupled to one or more different cloud instances. The ingress gateway and the egress gateway may be communicatively coupled to a set of (e.g., two or more) gateways deployed within the transit VPC (hereinafter, "transit gateways") via one or more peer-to-peer communication links operating in accordance with a secure network protocol such as Internet Protocol Security (IPSec) tunnels for example. Each of these gateways may be accessed in accordance with a unique Classless Inter-Domain Routing (CIDR) routing address to propagate messages over the network.

As described below, each ingress gateway is configured to assign a ClassID to an incoming data flow based on attributes associated with the data flow being in compliance with, and thereby satisfying, certain requirements of one or more of the network policies defined for the cloud network infrastructure by an administrator for a particular user (e.g., company, consortium, etc.). Herein, a network policy generally specifies a desired state, which may be represented by a collection of requirements that govern the forwarding of data flows (messages) between network devices. These network devices may be physical network devices or virtual network devices (e.g., software constructs operating as a particular network device).

Herein, according to one embodiment of the disclosure, the ClassID may be represented as a 24-bit or 32-bit value, which may be assigned with "local" granularity (e.g., ClassID only pertains to a segment of a data flow between neighboring network devices for that communication session) or may be assigned with "global" granularity (e.g., ClassID is unique and pertains to a particular data flow for any communications throughout the private cloud network). The "global" ClassID reduces complexity in flow analytics (e.g., sampling of the propagation of particular messages) and improves overall network efficiency as the rate of change of ClassIDs is diminished to reduce the frequency of gateway configuration changes being made by the controller to address ClassID changes) and shall be discussed hereinafter.

According this embodiment of the disclosure, the attributes associated with the data flow may be based, at least in part, on static attributes and dynamic attributes. The static attributes associated with the data flow may be ascertained from information associated with the ingress gateway, given that the ingress gateway is co-located with an application of a cloud instance that is the source of the data flow. Examples of static attributes may include, but are not limited or restricted to location-based attributes (e.g., same cloud region, same cloud zone, same geo-location such as country, state, city, community or other geographic area, same cloud provider, etc.). In contrast, the dynamic attributes may be obtained from content of the data flow, such as through the use of the source address of the data flow as an index to an address-to-attribute mapped data store, as described below.

As another example, the ClassID may be determined through a decision tree structure, which may assign the resultant ClassID based on which network policy or combination of network policies is most closely correlated to certain attributes associated with the data flow. Alternatively, the ClassID may be at the controller level in which data flows associated with each application is classified and an IP address to ClassID mapping table is provided to each ingress gateway by the controller. Independent of the type of ClassID determination process, the number of ClassIDs may correspond to the number of network policies so that ClassIDs change only when requirements associated with a particular network policy change.

Further details of the logic associated with one embodiment of the load-balanced, full-mesh network system architecture are described below:

Instance Subnets: Multiple instance subnets may be supported by an edge VPC so that data flows from a cloud instance of a particular instance subnet are forwarded to a selected ingress gateway.

Cloud Instance: A collection of software components that are configured to receive incoming data flows (one or more messages) and/or transmit outgoing data flows within a cloud network. As an illustrative example, the cloud instance may be comprised of a virtual web server, a plurality of applications being processed by the virtual web server, and a database maintained by the virtual web server. For this and other configurations, the cloud instance may generate (and transmit) different types of data flows that are classified differently depending on the attributes of the data flows. For example, data flows initiated by a backup agent being a first application of the applications operating on the web server would be classified differently than a browser application being one of the plurality of applications associated with the same cloud instance.

Gateways: Multiple gateways may be deployed in one or more VPCs to control the routing of data flows from a cloud instance, including a source application, to a cloud instance inclusive of a destination application. Having similar logical architectures, the gateways may be identified differently based on their location/operability within a cloud network. The "ingress" gateways are configured to interact with cloud instances including applications while "transit" gateways are configured to further assist in the propagation of data flows (e.g., one or more messages) directed to an ingress gateway within another edge VPC.

IPSec tunnels: Secure peer-to-peer communication links established between gateways, where the gateways may be located within the same VPC or located within different, neighboring VPCs. The peer-to-peer communication links are secured through a secure network protocol suite referred to as "Internet Protocol Security" (IPSec). With respect to one embodiment of a full-mesh network deployment, as an illustrative example, where an edge VPC may include "M" gateways (e.g., M≥1) and a neighboring (transit) VPC has N gateways (N≥1), M×N IPSec tunnels may be created between the edge VPC and the transit VPC. These IPSec tunnels are represented in gateways by virtual tunnel interfaces (VTI) and the tunnel states are represented by VTI states.

Gateway routing: In gateway routing table, routing paths between a gateway and an IP addressable destination to which the tunnel terminates (e.g., another gateway, on-prem computing device, etc.), identified by a VTI for example, may be governed, at least in part, by the ClassID generated at the ingress gateway. The routing paths may be further governed, at least in part, on analytics conducted on certain information associated with data traffic (e.g., 5-tuple—Source IP address, Destination IP address, Source port, Destination port, selected transmission protocol). If any of the IPSec tunnels state is changed or disabled (or re-activated), the corresponding VTI may be removed (or added) from consideration as to termination points for the selected routing path.

I. TERMINOLOGY

In the following description, certain terminology is used to describe features of the invention. In certain situations, each of the terms "logic," "component" and "device" is representative of hardware, software or a combination thereof, which is configured to perform one or more functions. As hardware, the logic (or component/device) may constitute control logic, which may include circuitry having data processing or storage functionality. Examples of such control circuitry may include, but are not limited or restricted to a processor (e.g., a microprocessor, one or more processor cores, a microcontroller, controller, programmable gate array, an application specific integrated circuit, etc.), wireless receiver, transmitter and/or transceiver, semiconductor memory, or combinatorial logic.

Alternatively, or in combination with the hardware circuitry described above, the logic (or component/device) may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be coded as a processor, namely a virtual processor.

The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As software, the logic may operate as firmware stored in persistent storage.

The term "computerized" generally represents that any corresponding operations are conducted by hardware in combination with software.

The term "gateway" may be construed as a virtual or physical network device. For instance, as an illustrative example, the gateway may correspond to a virtual network device in the form of software components, such as a virtual machine (VM)-based data routing component that is assigned a Private IP address within an IP address range associated with a VPC including the gateway. The gateway allows Cloud Service Providers (CSPs) and enterprises to enable datacenter and cloud network traffic routing between virtual and physical networks, including a public network (e.g., Internet). Alternatively, in some embodiments, the gateway may correspond to physical network device, such as an electronic device that is communicatively coupled to the network and assigned the hardware (MAC) address and IP address.

The term "cloud network infrastructure" generally refers to a combination of software components (e.g., instances) generated based on execution of certain software by hardware associated with the public cloud network. Each software component (or combination of software components) may constitute a virtual network resource associated with the public cloud network, such as a virtual switch, virtual gateway, or the like.

The term "message" generally refers to information in a prescribed format and transmitted in accordance with a suitable delivery protocol. Hence, each message may be in the form of one or more packets, frames, or any other series of bits having the prescribed format. A "data flow" generally refers to as one or more messages transmitted from a source maintained within a cloud network (e.g., a first application instance or other software component) to a destination (e.g., a second application instance or other software component).

The term "communication link" may be construed as a physical or logical communication path between two or more network devices. For instance, as a physical communication path, wired and/or wireless interconnects in the form of electrical wiring, optical fiber, cable, bus trace, or a wireless channel using infrared, radio frequency (RF), may be used. As a logical communication path, the communication link may be an Application Programming Interface (API) or other software construct that provides for a transfer of information between two software components that constitute two network devices in a logical representation.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. GENERAL SYSTEM ARCHITECTURE

Referring to FIG. 1, an exemplary embodiment of a cloud network infrastructure 110, which is deployed within a public cloud network 100 and is accessible to users associated with a particular enterprise. Herein, the cloud network infrastructure 110 includes a collection of virtual private cloud networks (VPCs), which support reliable communications between one or more cloud instances residing in different VPCs. The cloud network infrastructure 110 may be configured to operate as a load-balanced, full-mesh network as described in U.S. patent application Ser. No. 17/079,399 filed Oct. 23, 2020 entitled "Active Mesh Network System and Method," the entire contents of which are incorporated by reference herein.

According to this embodiment of the disclosure, as shown, the cloud network infrastructure 110 may be configured to support communications between a first VPC (hereinafter, "first edge VPC") 120 and a second edge VPC 130, which are communicatively coupled together via a third VPC (hereinafter, "transit VPC") 140. Although two edge VPCs 120 and 130 are illustrated in FIG. 1 for clarity sake, it is contemplated that the cloud network infrastructure 110 may deploy additional edge VPCs and multiple transit VPCs.

As shown, the first edge VPC 120 is configured with one or more instance subnetworks 150 (hereinafter, "subnets"), where each of these instance subnets 150 may include one or more cloud instances. As shown, each of the cloud instances (e.g., cloud instance 155) within the instance subnet 150 is configured to exchange data flows with class allocation routing logic 160. The class allocation routing logic 160 may be configured to (i) analyze content (e.g., data, meta-information, etc.) of an incoming data flow 165 (e.g., one or more messages) from the cloud instance 155, (ii) assign a classification identifier (ClassID) 170 to the data flow 165, and (iii) encapsulate the ClassID 170 into a message (or each of the messages) associated with the data flow 165.

Herein, according to one embodiment of the disclosure, the content of the data flow 165 is analyzed to identify certain attributes 167 associated with the data flow 165. Based on these attributes 167, the class allocation routing logic 160 may determine a user-defined network policy 180 that is directed to this type of data flow 165. The ClassID 170 is predicated on which network policy 180 (and its requirements) are correlated with (and satisfied by) the identified attributes 167 of the data flow 165. Thereafter, the encapsulation scheme for the ClassID 170 into the message(s) associated with the data flow 165, which produces a classified data flow 175, may be dependent on the transmission protocol supported by the cloud network infrastructure 110. In general, the ClassID 170 may be encapsulated into an IPSec header for each of the message(s) to form the classified the data flow 175.

The transit VPC 140 forwards the classified data flow 175 through different gateways, where the forwarding may be influenced by the ClassID 170. Re-routing logic 185, being a component of the second edge VPC 130, may be configured to remove the ClassID 170 from the classified data flow 175 and direct contents of the originally transmitted data flow 165 to a targeted destination cloud instance 190 being part of an instance subnet 195 supported by the second edge VPC 130.

Figure 2A:
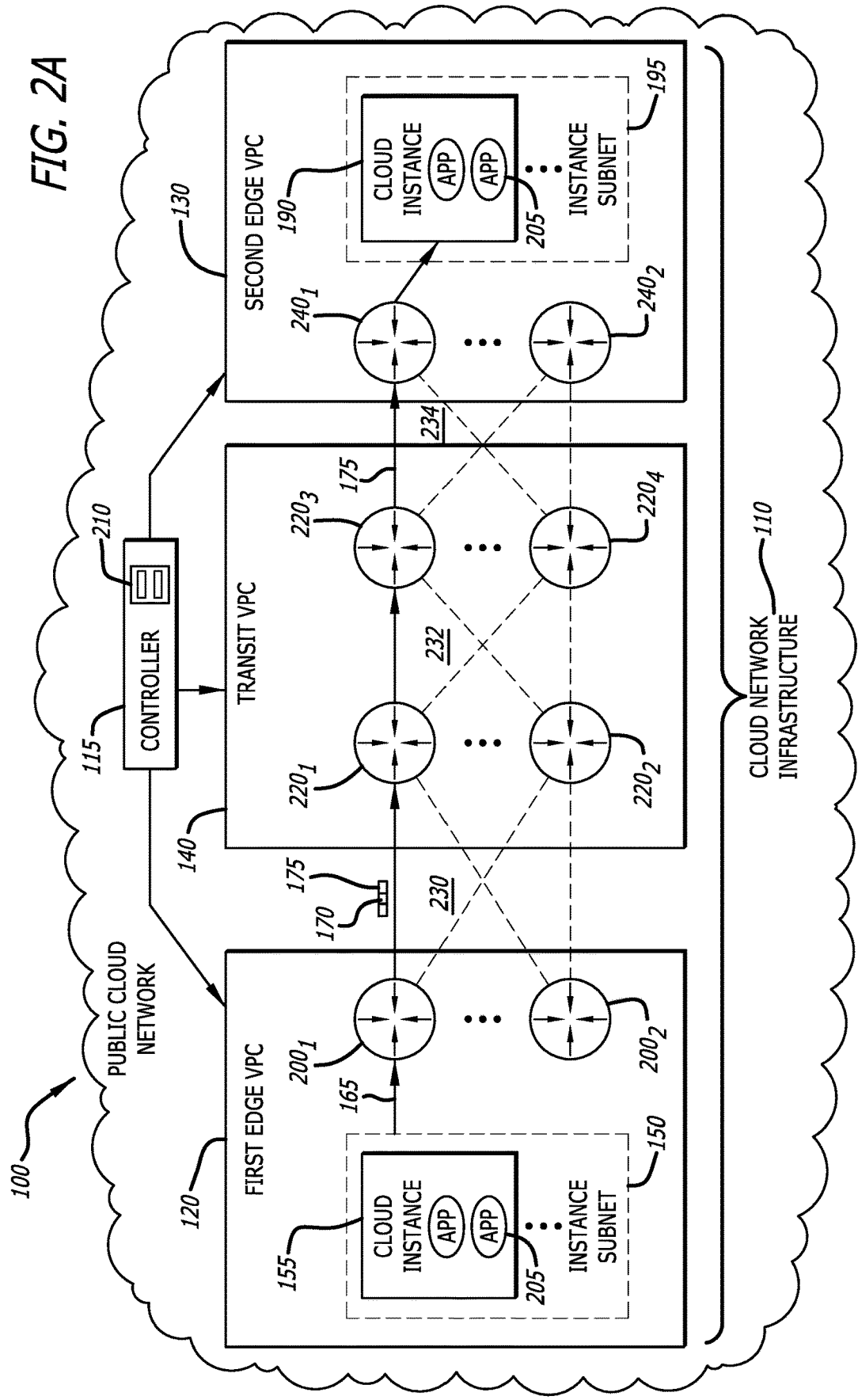
FIG. 2A is a more detailed representation of the cloud network infrastructure of FIG. 1.

Referring now to FIG. 2A, a more detailed representation of the exemplary embodiment of the cloud network infrastructure 110, which includes the first edge VPC 120 and the second edge VPC 130 communicatively coupled via the transit VPC 140, is shown. Herein, the first edge VPC 120 is configured with the instance subnet(s) 150, where the cloud instance 155 within the instance subnet 150 is configured to exchange data flows with the class allocation routing logic 160, namely a gateway of a set of (e.g., two or more) gateways $200_1$-$200_M$ (M≥2) maintained in the first edge VPC 120. Herein, these gateways $200_1$-$200_M$ are referred to as "ingress gateways" $200_1$-$200_M$.

More specifically, the controller 115 for the cloud network infrastructure 110 is configured to manage communications between the instance subnet(s) 150 and the set of ingress gateways $200_1$-$200_M$ through use of a VPC routing table 210, which is initially configured to identify which ingress gateway $200_1$ ... or $200_M$ is responsible for interacting with which instance subnets 150 or cloud instances. According to one embodiment of the disclosure, each of the cloud instances may be comprised of multiple software components operating collectively as a virtual resource. For example, as described above, the cloud instance 155 may correspond to a virtual web server configured to execute a plurality of applications 205, where these applications 205 may generate and output different types of data flows 165.

Referring still to FIG. 2A, according to one embodiment of the disclosure, the cloud network infrastructure 110 may be accomplished by peering the set of ingress gateways $200_1$-$200_M$ deployed within the first edge VPC 120 to a set of gateways $220_1$-$220_N$ (N≥2) deployed within the transit VPC 140, which may be referred to as "transit gateways" $220_1$-$220_N$. For ease of illustration, the set of ingress gateways $200_1$-$200_M$ is represented as a first ingress gateway $200_1$ and a second ingress gateway $200_2$, although three or more ingress gateways may be deployed within the edge VPC 120. Similarly, a first stage of the set of transit gateways $220_1$-$220_N$ is represented by a first transit gateway $220_1$ and a second transit gateway $220_2$, although three or more transit gateways may be deployed within the transit VPC 140.

As shown, the ingress gateway $200_1$ is configured for communications with transit gateways $220_1$-$220_2$ via peer-to-peer communication links 230. In particular, according to one embodiment of the disclosure, the ingress gateway (e.g., ingress gateway $200_1$) may be communicatively coupled to each of the transit gateways $220_1$-$220_2$ via multiple, active peer-to-peer communication links. Similarly, as shown for illustrative purposes, the transit gateway $220_1$-$220_2$ may be communicatively coupled to other transit gateways (e.g., transit gateways $220_3$-$220_4$) via peer-to-peer communication links 232 and/or a set of gateways $240_1$-$240_P$ (P≥2) maintained in the second edge VPC 130 via peer-to-peer communication links 234. Herein, these gateways $240_1$-$240_P$ are referred to as "egress gateways" $240_1$-$240_2$. Also, the peer-to-peer communication links 230, 232 and/or 234 may constitute cryptographically secure tunnels, such as IPSec tunnels. The management of the IPSec tunnels 230, 232 and 234 may be accomplished through gateway routing tables (not shown) maintained by each of the respective gateways $200_1$-$200_2$, $220_1$-$220_4$ and $240_1$-$240_2$.

With respect to operation, the first edge VPC 120 is configured with one or more instance subnets 150, which include a plurality of cloud instances inclusive of cloud instance 155. Cloud instance 155 is configured to provide the data flow 165 to the ingress gateway $200_1$. The ingress gateway $200_1$ is configured to analyze content of the data flow 165 and assign the ClassID 170 thereto. The ClassID 170 is predicated on which network policy from a group of network policies 250 includes requirements have a high degree of correlation to attributes of the incoming data flow 165. For instance, according to one embodiment of the disclosure, the ClassID 170 may be based, at least in part, on which network policy 180 from the group of user-defined network policies 250 is composed of requirements that correlate to attributes of the data flow 165.

Figure 2B:
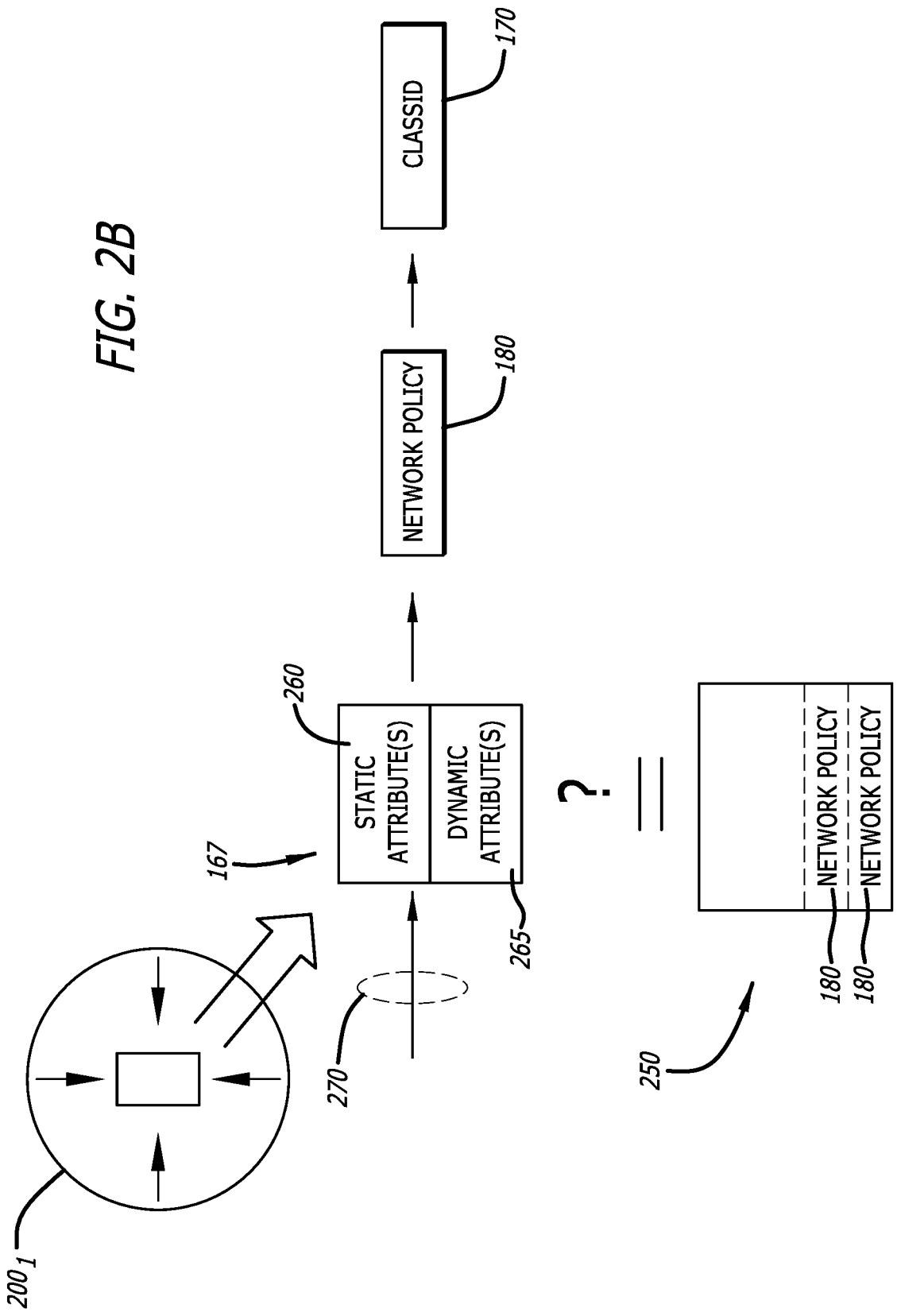
FIG. 2B is a logical representation of operations of the cloud network infrastructure of FIG. 1 to generate the ClassID.

More specifically, as shown in both FIGS. 2A-2B, after formulation of the network policies 250 and receipt of the incoming data flow 165, the ingress gateway $200_1$ is configured to analyze content of the data flow 165 by determining its attributes 167. These the attributes 167 may include static attributes 260 and dynamic attributes 265.

According to one embodiment of the disclosure, the static attributes 260 may be available from properties associated with the ingress gateway $200_1$ based on the co-location of both the ingress gateway $200_1$ and the cloud instance 155. Examples of the static attributes 260 may include information associated with the location of the cloud instance 155 including a source application for the data flow 165, which would be the same location as the ingress gateway $200_1$ (e.g., cloud provider, cloud region, cloud zone, geo-location such as country, state, city, community or other sub-areas). The dynamic attributes 265 may be available to the ingress gateway $200_1$ through an IP-address-to-attribute mapping 270 provided by the controller 115. The mapping 270 identifies attributes that may be applicable to the source application. These attributes may include, but are not limited or restricted to the following attributes set forth in Table A:

TABLE A

| SOURCE ATTRIBUTES | WORKLOAD ATTRIBUTES |
|---|---|
| IAM role (if an instance or container) | Tags |
| Service account (if Kubernetes container) | Namespace (if Kubernetes container) |
| Project ID | Labels (if Kubernetes container) Destination Kubernetes Service (if Kubernetes container) |
| NETWORK ATTRIBUTES | OSI APPLICATION LAYER DATA |
| VPC/Virtual Network | Layer-7 protocol |
| Security Group (if an instance) | Layer-7 requests |

Thereafter, the ClassID 170 may be determined, at least in part, based on the values of some or all of these attributes 260 and 265.

Figure 2C:
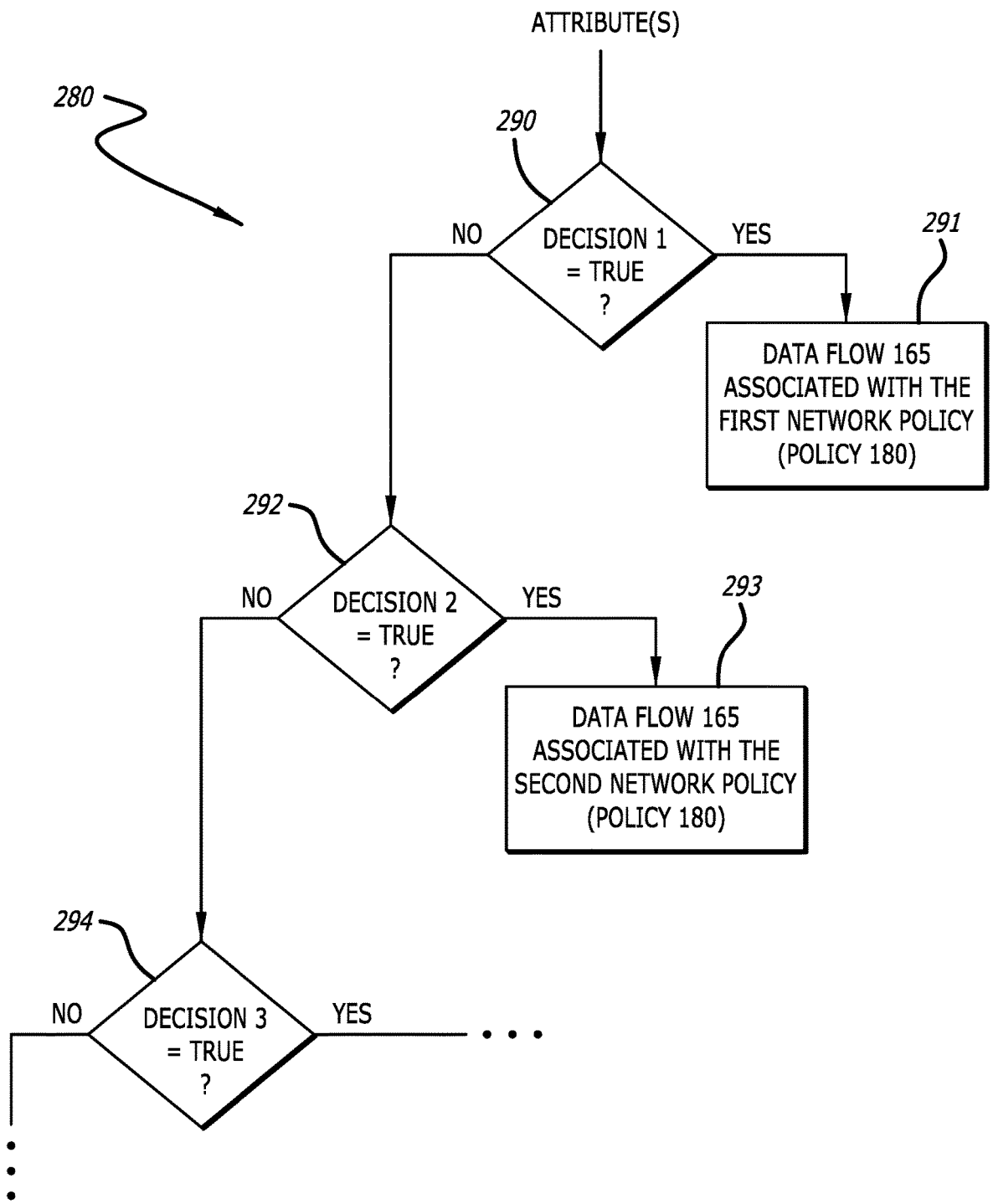
FIG. 2C is an exemplary decision tree structure illustrative of a determination of a network policy or network policies associated with a data flow under analysis.

According to other embodiments of the disclosure, the ClassID 170 may be determined, at least in part, through a decision tree analysis that associates values for particular attributes to decisions that would represent a correlation with requirements of a network policy. As an illustrative example, a decision tree structure 280 for use in determining a network policy or network policies associated with the data flow 165 is shown in FIG. 2C. Herein, the decision tree structure 280 may feature decisions 285 based on a presence (or absence) of particular attributes and/or the value of these attributes. For this illustrative example, the result of a first decision 290 may identify that the data flow 165 is associated with a first network policy 291 or is subject to a second decision 292. Similarly, based on the second decision 292, a result is produced that identifies the data flow 165 is associated with a second network policy 293 or is subject to a third decision 294. Upon identifying the network policy associated with the data flow 165, the ingress gateway $200_1$ may assign a ClassID corresponding to the network policy or group of network policies to which the attributes of the data flow 165 are highly correlated.

As described above, the manner of encapsulation of the ClassID 170 into the data flow 165 to produce the classified data flow 175 may be dependent on the transmission protocol supported by the cloud network infrastructure 110. For example, where the data flow 165 constitutes one or more UDP-based IP packets, the ClassID 170 may be implemented with an encapsulated portion of a message of the classified data flow 175 (e.g., body of message with the Encapsulated Security Protocol "ESP" header, the body of message with Wireguard header, etc.).

Referring back to FIG. 2A, the transit VPC 140 forwards the classified data flow 175 through different transit gateways $220_1$-$220_4$, where the forwarding may be influenced by the ClassID 170. For instance, the ClassID 170 may be used to determine which of the communication links 232 to use in routing the classified data flow to the egress gateway $240_1$. Additionally, each of the transit gateways $220_1$-$220_4$ may be configured to conduct filtering operations based, at least in part, on the ClassID 170 in lieu of conventional firewall techniques of relying on source or destination IP addresses. As an example, a transit gateway (e.g., transit gateway $220_1$) may conduct traffic limiting operations by eliminating data flows exceeding a certain size (in bytes), exceeding a certain burst size or burst length, exceeding a bandwidth threshold, constituting a particular type of data flow that is precluded from transmission at all (or to a particular application or to a particular edge VPC), or the like.

Egress gateway $240_1$, being a component of the second edge VPC 130, is responsible for removing the ClassID 170 from the classified data flow 165 and directing contents of the data flow 165 to a targeted destination cloud instance 190 being part of the subnet 195 supported by the second edge VPC 130.

III. GENERAL GATEWAY ARCHITECTURE

Figure 3A:
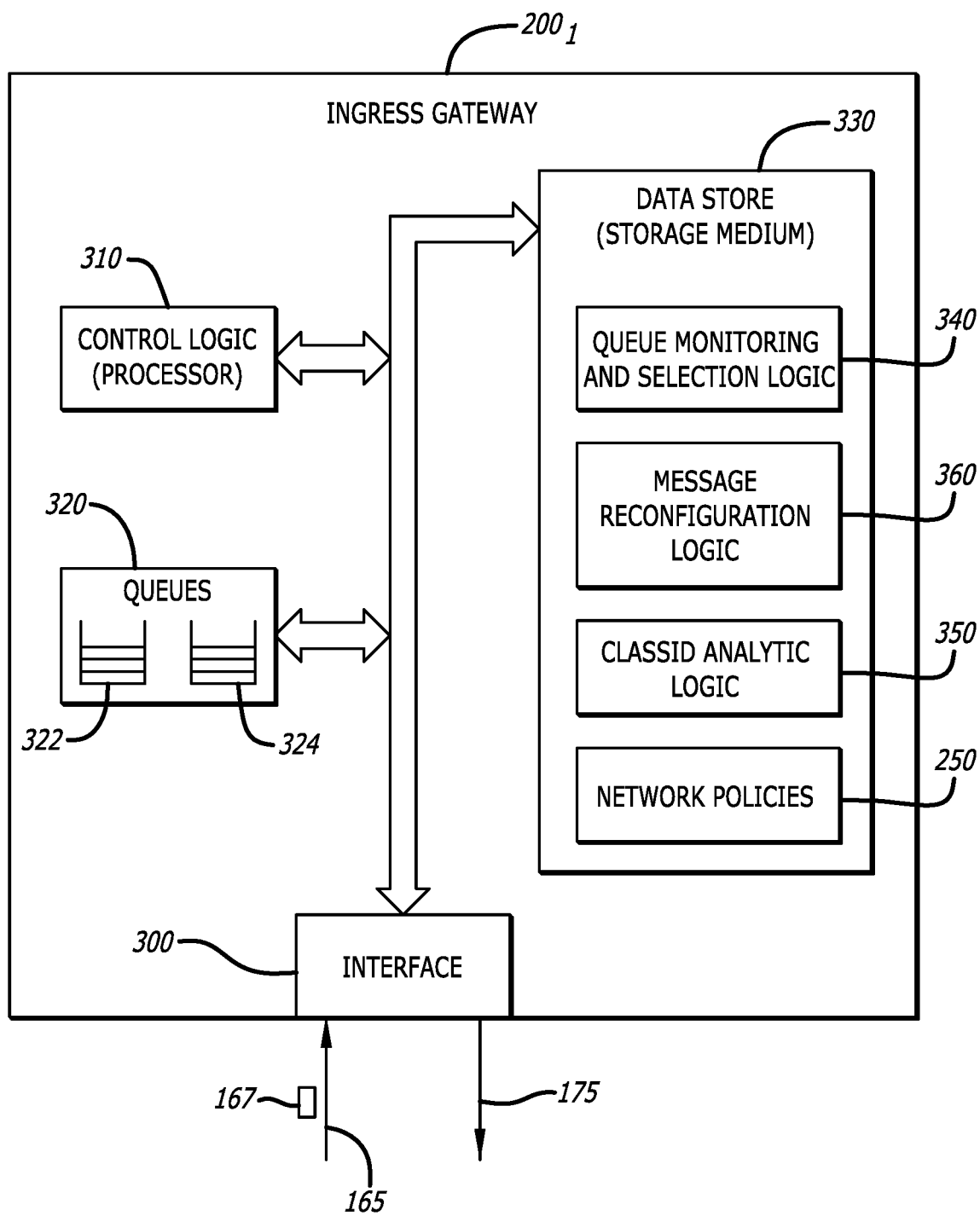
FIG. 3A is a first exemplary embodiment of a logical architecture of the ingress gateway of FIG. 2A.

Referring now to FIG. 3A, a first exemplary embodiment of a logical architecture of the ingress gateway $200_1$ is shown. Herein, the ingress gateway $200_1$ includes an interface 300, control logic 310, queues 320 and non-transitory storage medium (e.g., data store) 330. The data store 330 features queue monitoring and selection logic 340, ClassID analytic logic 350, message reconfiguration logic 360 and network policies 250. The ingress gateway $200_1$ is configured to receive the data flow 165 (e.g., one or more messages) via the interface 300 and to generate the ClassID 170 associated with the data flow 165 for transmission, as part of the data flow 165, from the interface 300.

As shown, the queues 320 may be incoming queues 322 and/or outgoing queues 324. For instance, after receipt via the interface 300, the content associated with the data flow 165 may be temporarily maintained within the incoming queues 322 prior to analysis by the ClassID analytic logic 350. The outgoing queues 324 may also be used as temporary storage for the classified data flows 175 awaiting transmission from the ingress gateway $200_1$. The outgoing queues 324 may be structured in accordance with a classification priority in which transmission of the classified data flows 175 may be prioritized based on the assigned ClassID. In general, the queuing policy may be based, at least in part on the ClassID assigned to the data flow 165.

More specifically, the queue monitoring and selection logic 340, executed by the control logic 310 (e.g., one or more processors), may detect storage of content associated with the data flow 165 within the incoming queues 322 and signals the ClassID analytic logic 350 accordingly. The ClassID analytic logic 350 is configured to (i) determine which of the network policies 250 is applicable to the data flow 165 and (ii) assign the ClassID 170 in accordance with the determined network policy. For example, the ClassID 170 may be selected by determining, based on the attributes 167 of the data flow 165, which requirements of the network policies 250 correlate to these attributes 167. The ClassID 170 may correspond to the network policy or group of network policies with requirements that best correlate to the attributes of the data flow 165.

Additionally, the message reconfiguration logic 360 is adapted to encapsulate the ClassID 170 appropriately into the data flow 165 to generate the classified data flow 175 for transmission directed to a targeted cloud instance. Additionally, the message reconfiguration logic 360 may include route prediction logic to select the particular transit gateway and communication link to receive the classified data flow. Such selection may be based, at least in part, on the ClassID 170 encapsulated into the classified data flow 175. For example, the classified data flow 175 may be routed to a particular transit gateway 220₂, which is configured with a certain security policy that is needed for the particular data flow (e.g., transit gateway 220₂ supports Payment Card Industry Data Security Standard "PCI DSS" in the event that the classified data flow 175 is credit card information.

Concurrent (e.g., at least partially overlapping in time) or after the above-described operations of the message reconfiguration logic 360, the queue monitoring and selection logic 340, executed by the control logic 310, may select one of the outgoing queues 324 based on the ClassID 170 associated with the data flow 165. The outgoing queues 324 may be assigned certain priorities so that classified data flows 175 associated with a particular ClassID may be transmitted in advance of classified data flows 175 associated with another ClassID.

Figure 3B:
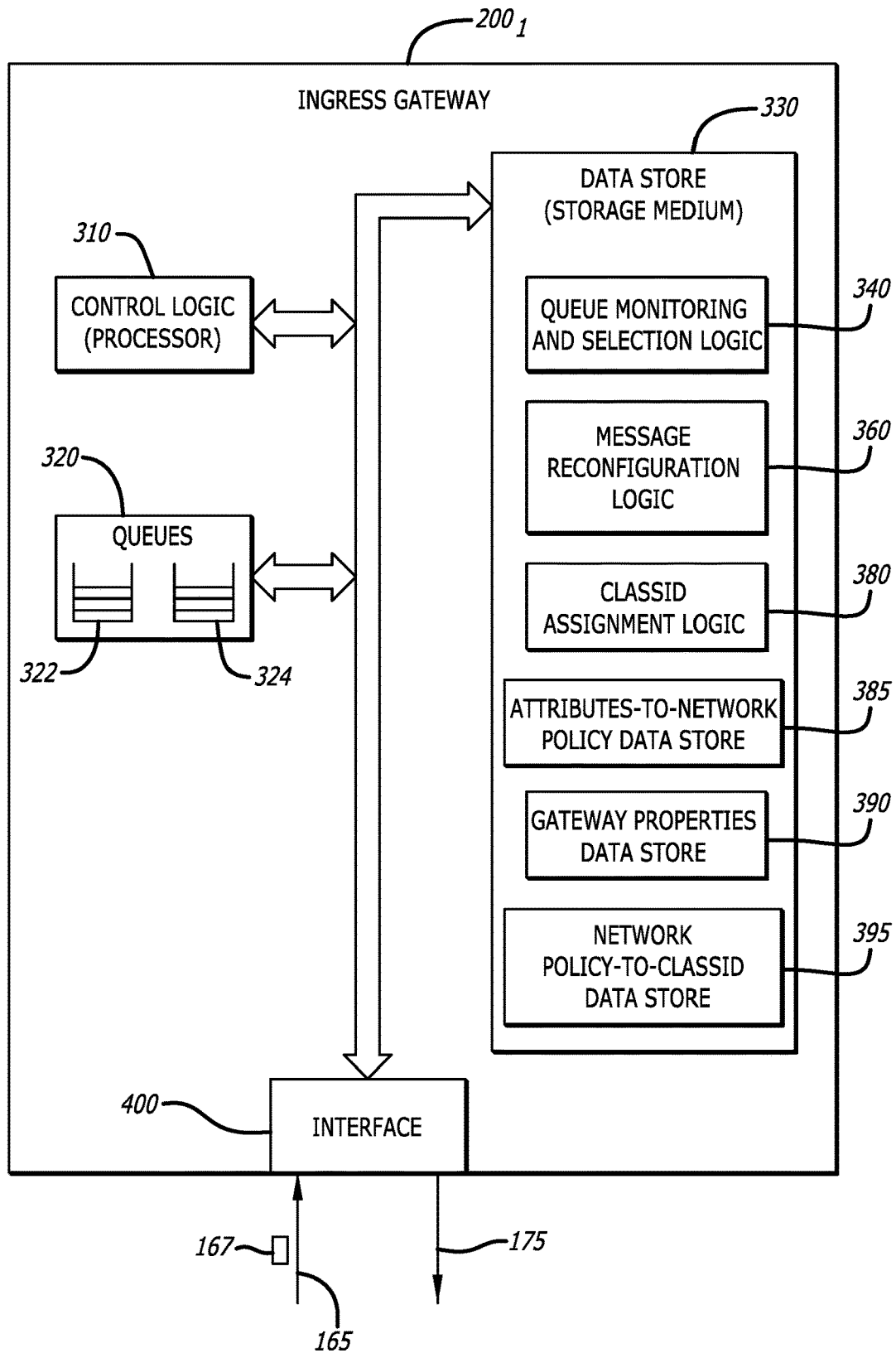
FIG. 3B is a second exemplary embodiment of the logical architecture of the ingress gateway of FIG. 2A.

Referring to FIG. 3B, a second exemplary embodiment of a logical architecture of the ingress gateway 200₁ is shown. Herein, the ingress gateway 200₁ includes the interface 300, the control logic 310, the queues 320 and the non-transitory storage medium (e.g., data store) 330 as illustrated in FIG. 3A. However, in lieu of the ClassID analytic logic 350, the data store 330 includes a ClassID assignment logic 380 operating in combination with an attributes-to-network policy data store 385, gateway properties data store (for static attributes) 390 and an Network Policy-to-ClassID data store 395. Herein the ClassID assignment logic 380 is configured to determine the network policy 180 from the network policies 250 that is applicable to the data flow 165 by at least accessing static attributes from the gateway properties data store 390 and dynamic attributes from the content of the data flow 165. Collectively, certain attributes (e.g., static, dynamic or a combination of static and dynamic attributes) may be used to determine which of the network policies 250 are applicable to the data flow 165. Thereafter, the ClassID assignment logic 380 accesses the Network Policy-to-ClassID data store 395 to determine the ClassID 170 associated with the data flow 165 originating from the cloud instance 155. Of course, as an alternative embodiment (not shown), the ClassID assignment logic 380 may simply access a prescribed table based on attributes-to-ClassID relationship.

Figure 4:
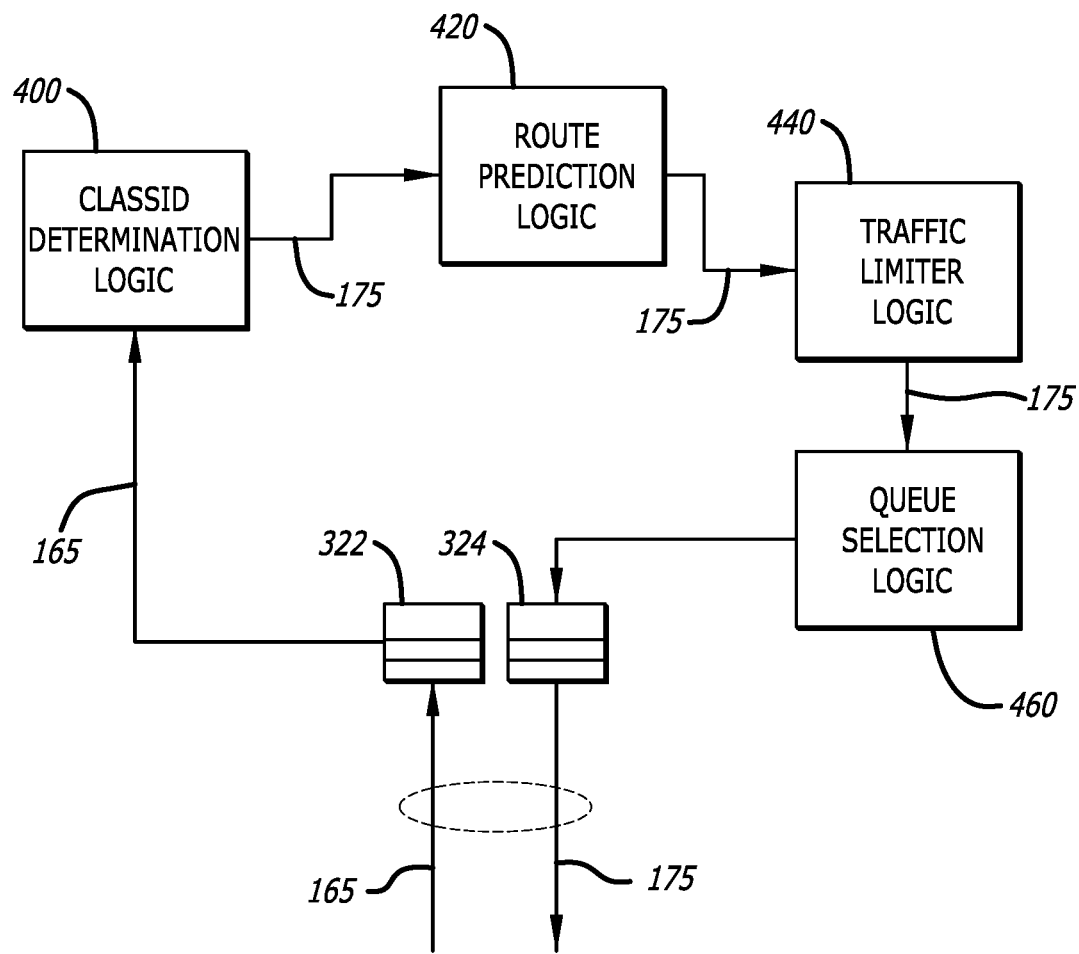
FIG. 4 is an exemplary embodiment of general logical operations of the ingress gateway of FIGS. 2A-2B is shown.

Referring now to FIG. 4, an exemplary embodiment of the general logical operations of the ingress gateway 200₁ of FIG. 2A is shown. Herein, the ingress gateway 200₁ includes ClassID determination logic 400 (e.g., ClassID analytic logic 350 or ClassID assignment logic 380 and needed resources); route prediction logic 420; traffic limiter logic 440; and queue selection logic 460. Herein, the incoming data flow 165 is received by the ClassID determination logic 400, which assigns a ClassID to the data flow 165 based on which network policy (or policies) are applicable to the data flow 165. The ClassID is encapsulated within the data flow 165 to generate the classified data flow 175. The classified data flow 175 is provided to the route prediction logic 420.

The route prediction logic 420 is configured to determine the particular transit gateway and corresponding communication link to receive the classified data flow 175 for routing to a targeted application. This determination may be based, at least in part, on the selected ClassID 170 included as part of the classified data flow 175. The traffic limiter logic 440 is configured to receive the classified data flow 175 and to "shape" the traffic by controlling propagation of the classified data flows through filtering. The queue selection logic 460 determines which outgoing queues 324 to receive the classified data flows 175, especially when different outgoing queues 324 are assigned different priorities.

IV. OPERATIONAL FLOW

Figure 5:
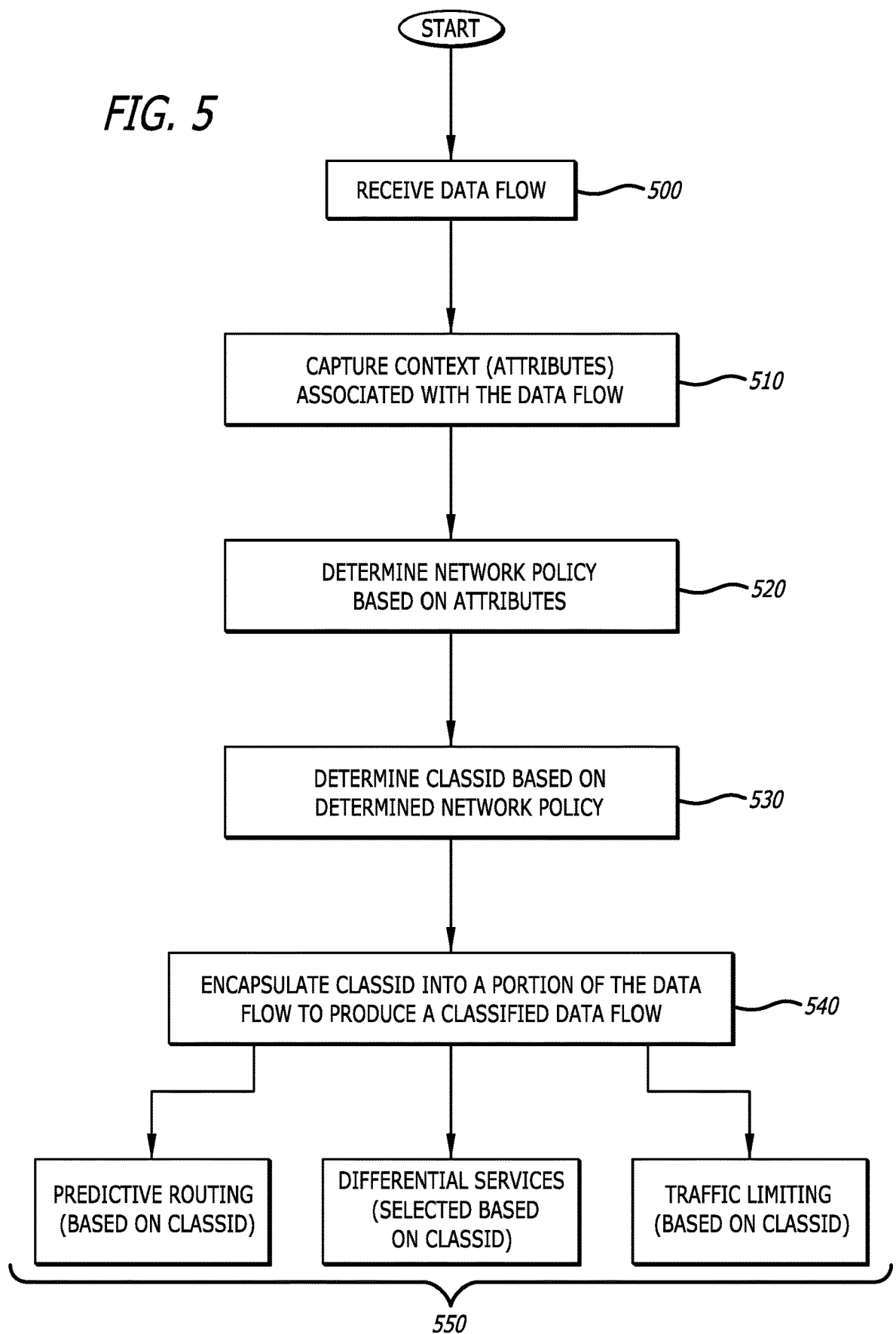
FIG. 5 is a flowchart of a flowchart of an exemplary embodiment of the operability throughout the cloud network infrastructure of FIG. 1 in classifying data flows transmitted between applications being part of cloud instances deployed in different virtual private cloud networks (VPCs).

Referring now to FIG. 5, a flowchart of an exemplary embodiment of the operability throughout the cloud network infrastructure of FIG. 1 in classifying data flows transmitted between applications being part of cloud instances deployed in different virtual private cloud networks (VPCs). Herein, according to one embodiment of the disclosure, the data flow is received by a first virtual network device (block 500). The first virtual network device captures context information associated with the data flow, namely attributes associated with the data flow (block 510). These attributes may be directed to the source application from which the data flow originated such as location attributes, workload attributes, identity attributes, or other attributes as identified in Table A.

Based on these attributes, the first virtual network device determines a network policy (or group of network policies) that comports to selected attributes of the data flow, and based on the determined network policy (or group of network policies), a classification identifier (ClassID) for the data flow is selected (blocks 520 and 530). Thereafter, the ClassID is encapsulated into a portion of the data flow to form a classified data flow (block 540). The first virtual network device outputs the classified data flow, upon which actions are performed by other virtual network devices prior to receipt by an application targeted by the source application to receive the data flow (block 550). These actions may include, but are not limited or restricted to predictive routing based, at least in part, on the ClassID, differential services (e.g., Quality of Service "QoS" or Security), traffic limiting (e.g., filtering, etc.).

Embodiments of the invention may be embodied in other specific forms without departing from the spirit of the present disclosure. The described embodiments are to be considered in all respects only as illustrative, not restrictive.

What is claimed is:

1. A computerized method for providing network policy-based routing of a data flow, comprising:
obtaining attributes associated with an incoming data flow;
determining one or more network policies based on the attributes associated with the incoming data flow;
assigning a classification identifier based on the one or more network policies, wherein the classification identifier is configured to influence routing paths through at least one cloud network; and
encapsulating the classification identifier into content of the incoming data flow to generate a classified data flow for routing from a source to a destination through the at least one cloud network.

2. The computerized method of claim 1, wherein the source is a first cloud instance and the destination is a second cloud instance.

3. The computerized method of claim 2, wherein the first cloud instance is deployed within a first public cloud network and the second cloud instance is deployed within a second public cloud network different from the first public cloud network.

4. The computerized method of claim 2 further comprising:
determining, based on the classification identifier encapsulated into the content of the incoming data flow, which communication link or communication links to use in routing the data flow from a first gateway to a second gateway.

5. The computerized method of claim 4 further comprising:
upon receiving the data flow by the second gateway, removing the classification identifier and directing contents of the data flow to the second cloud instance.

6. The computerized method of claim 5, wherein the first cloud instance is part of a first virtual private cloud network and the second cloud instance is part of a second virtual private cloud network.

7. The computerized method of claim 6, wherein the first virtual private cloud network is deployed within a first public cloud network and the second virtual private cloud network is deployed within a second public cloud network different from the first public cloud network.

8. The computerized method of claim 1, wherein the obtaining of the attributes associated with the incoming data flow comprises obtaining static attributes associated with the data flow based on properties associated with an ingress gateway receiving the incoming data flow.

9. The computerized method of claim 8, wherein the static attributes associated with the data flow include a location of the ingress gateway that corresponds to a location of a cloud instance operating as a source of the data flow.

10. The computerized method of claim 1, wherein the obtaining of the attributes associated with the incoming data flow comprises obtaining dynamic attributes associated with the data flow obtained based on a mapping between (i) a network address associated with a source of the incoming data flow and (ii) attributes associated with the source.

11. The computerized method of claim 1, wherein the determining of the one or more network policies by identifying the one or more network policies correlated to the attributes.

12. The computerized method of claim 1, wherein the determining of the one or more network policies comprises conducting a decision tree analysis by determining whether the incoming data flow includes a first selected attribute of the attributes, determining that the incoming data flow is associated with a first network policy based on the incoming data flow featuring the first selected attribute, and performing iterative analyses for attributes that identify a data flow associated with a particular network policy.

13. The computerized method of claim 1, wherein the assigning the classification identifier comprises identifying the classification identifier corresponding to the one or more network policies determined to be associated with the incoming data flow.

14. A computing platform, comprising:
a controller; and
a first virtual private cloud network communicatively coupled to the controller, the first virtual private cloud network includes at least a first gateway configured to assign classification identifiers to incoming data flows,
wherein the first gateway being configured to (i) obtain attributes associated with a data flow of the incoming data flows, (ii) determine one or more network policies based on the attributes associated with the data flow, (iii) assign a classification identifier based on the one or more network policies, the classification identifier being configured to influence routing paths through at least one cloud network, and (iv) encapsulate the classification identifier into content of the data flow to generate a classified data flow for routing from the first gateway to a second gateway.

15. The computing platform of claim 14, wherein the first gateway of the first virtual private cloud network is communicatively coupled to a first cloud instance operating as a source of the data flow.

16. The computing platform of claim 15, wherein the first virtual private cloud is deployed within a first public cloud network while the second gateway is implemented within a second virtual private cloud network deployed within a second public cloud network different from the first public cloud network.

17. The computing platform of claim 14, wherein the attributes include one or more static attributes associated with the data flow based on properties associated with the first gateway.

18. The computing platform of claim 17, wherein the one or more static attributes associated with the data flow include a location of the first gateway that corresponds to a location of a cloud instance operating as a source of the data flow.

19. The computing platform of claim 17, wherein the attributes further include one or more dynamic attributes associated with the data flow obtained from a mapping between (i) a network address associated with a source of the data flow and (ii) attributes associated with the source.

20. The computing platform of claim 14, wherein the first gateway is configured to determine the one or more network policies by at least identifying the one or more network policies being correlated to the attributes.

21. The computing platform of claim 14, wherein the first gateway further configured to determine, based on the classification identifier encapsulated into the content of the data flow, which communication link or communication links to use in routing the data flow from the first gateway to the second gateway.

22. The computing platform of claim 21 further comprising:
upon receiving the data flow by the second gateway, removing the classification identifier and directing contents of the data flow to a second cloud instance operating as a destination for the data flow.

* * * * *